(12) United States Patent
Pan

(10) Patent No.: US 9,043,831 B2
(45) Date of Patent: May 26, 2015

(54) ADVERTISEMENT DELIVERING SYSTEM BASED ON DIGITAL TELEVISION SYSTEM AND MOBILE COMMUNICATION DEVICE

(71) Applicant: Yang Pan, Singapore (SG)

(72) Inventor: Yang Pan, Singapore (SG)

( * ) Notice: Subject to any disclaimer, the term of this patent is extended or adjusted under 35 U.S.C. 154(b) by 160 days.

(21) Appl. No.: 14/027,198

(22) Filed: Sep. 14, 2013

(65) Prior Publication Data

US 2014/0013350 A1 Jan. 9, 2014

Related U.S. Application Data

(63) Continuation-in-part of application No. 12/856,588, filed on Aug. 14, 2010, now Pat. No. 8,850,495.

(51) Int. Cl.

| | |
|---|---|
| H04N 21/435 | (2011.01) |
| H04N 21/254 | (2011.01) |
| H04N 21/40 | (2011.01) |
| H04N 21/414 | (2011.01) |
| H04N 21/422 | (2011.01) |
| H04N 21/41 | (2011.01) |
| H04N 21/4722 | (2011.01) |
| H04N 21/4367 | (2011.01) |
| G06Q 30/02 | (2012.01) |
| H04N 21/4725 | (2011.01) |
| H04N 21/61 | (2011.01) |
| H04N 21/81 | (2011.01) |
| H04N 5/44 | (2011.01) |
| H04N 5/445 | (2011.01) |
| H04N 21/478 | (2011.01) |

(52) U.S. Cl.
CPC ......... *H04N 21/435* (2013.01); *H04N 21/2542* (2013.01); *H04N 21/40* (2013.01); *H04N 21/414* (2013.01); *H04N 21/42224* (2013.01); *H04N 21/4108* (2013.01); *H04N 21/4722* (2013.01); *H04N 21/4367* (2013.01); *H04N 21/41407* (2013.01); *G06Q 30/02* (2013.01); *H04N 21/4725* (2013.01); *H04N 21/6125* (2013.01); *H04N 21/812* (2013.01); *H04N 5/4403* (2013.01); *H04N 5/44591* (2013.01); *H04N 21/4126* (2013.01); *H04N 21/42208* (2013.01); *H04N 21/47815* (2013.01); *H04N 2005/4408* (2013.01); *G06Q 30/0267* (2013.01)

(58) Field of Classification Search
None
See application file for complete search history.

(56) References Cited

U.S. PATENT DOCUMENTS

| | | |
|---|---|---|
| 6,351,270 B1 | 2/2002 | Nishikawa et al. |
| 6,718,551 B1 | 4/2004 | Swix et al. |
| 7,269,837 B1 | 9/2007 | Redling et al. |
| 7,346,606 B2 | 3/2008 | Bharat |
| 2003/0167467 A1 | 9/2003 | Allen et al. |
| 2004/0078814 A1 | 4/2004 | Allen |
| 2005/0044577 A1 | 2/2005 | Jerding et al. |
| 2005/0154996 A1 | 7/2005 | Othmer |
| 2007/0291747 A1 | 12/2007 | Stern et al. |
| 2010/0011304 A1 | 1/2010 | van Os |
| 2010/0082455 A1 | 4/2010 | Rosenblatt et al. |

*Primary Examiner* — Justin Shepard

(57) ABSTRACT

A digital television system is connected to a mobile computing and communication device through an ad hoc communication link. A program broadcasted by the television system includes a plurality frames delivered in a sequential manner. A user can freeze a frame by employing the mobile device. The frame can then be transmitted to the mobile device and be redisplayed on the mobile device. The redisplayed frame includes visible symbols pointing to displayed items associated with advertising messages. The frame can also be stored in a photograph folder for the user to view the frame and associated advertising messages in a later time.

20 Claims, 18 Drawing Sheets

| Item | Product ID | Advertisement files |
|---|---|---|
| A | 12345678 | |
| B | 91234567 | |
| C | 89123456 | |
| D | 78912345 | File_D |
| E | 67891234 | |
| F | 56789123 | |
| G | 45678912 | File_G |

ADVERTISEMENT DELIVERING SYSTEM BASED ON DIGITAL TELEVISION SYSTEM AND MOBILE COMMUNICATION DEVICE

CROSS-REFERENCE TO RELATED APPLICATIONS

The present application is a continuation in part of the patent application Ser. No. 12/856,588 filed on Aug. 14, 2010.

BACKGROUND

1. Field of the Invention

This invention relates generally to advertising. More specifically, the invention relates to system and method for delivering advertisements to a mobile communication device.

2. Description of Prior Art

Advertising using television is well known. Unfortunately, even when armed with demographic studies and entirely reasonable assumptions about the typical audience of various media outlets, advertisers recognize that much of their advertisement budget is simply wasted. Moreover, it is difficult to identify and eliminate such waste.

Mobile communication devices have gained significant popularity in recent years. Users are using the mobile device such as, for example, iPhone from Apple Inc, Cupertino, Calif., to access the Internet services. Methods for delivering targeted advertisements to users by employing mobile communication devices have been developed. The targeted advertising messages may be delivered based upon the user's personal profile, location and history of the user's interaction with the device.

Even when sometimes the advertisements broadcasted by the television are attracted by a viewer, the information provided by the television is often insufficient for the viewer to make a purchasing related decision.

The adoption of digital television system has opened up new opportunities to deliver advertisements to targeted customers. The opportunities, however, have not been fully explored, in particularly, when the digital television system and the mobile communication devices are combined.

SUMMARY OF THE INVENTION

It is an object of the present invention to disclose a system and method for delivering highly targeted advertisements to a user of a digital television system and a mobile communication device.

In accordance with one embodiment of the present invention, the digital television (TV) system is used to deliver a program to a viewer. The program comprises a series of frames or images. Each frame of the program may include a number of items on a display screen. Some of items may be of commercial interests. The term "item" is used in the present disclosure to represent an image of an item on a display of the digital television system.

According to one aspect of the present invention, the digital television system includes a database. Each of the commercial items is linked to a product identifier in the database.

When a user is attracted by a commercial item displayed in a frame, he may use a remote control device to select the item. A data file including the product identifier of the selected item is then sent to a connected mobile communication device through an ad hoc communication link.

The received file may be represented by an icon on a display screen of the mobile device according to one implementation. The data file may include a product identifier related to the advertisement.

The user may select the icon for more detailed information about the product. Upon the selection of the icon by the user, the mobile device is connected to a data manager through the Internet. The information delivered to the user from the data manager may include but not limited to pricing, features, reliability, commercial terms and customer rating. The information may also include pricing comparison from different retailers. The user may decide to purchase the product through an on-line facility.

In another embodiment, a frame can be frozen by the user through the use of the mobile communication device. Frozen frame can be transmitted to the mobile communication device together with associated advertising messages. The displayed items associated with the advertising messages are marked by visible symbols. The user can select displayed items and view detailed contents of the messages.

In yet another embodiment, received frame is stored in a folder for the user to view the frame and associated advertising messages in a later time. The folder can be the folder for storing photographs. The frame is stored in a similar manner as one of the photographs.

In yet another embodiment, a signal is transmitted to the mobile communication device. An alerting symbol can be displayed on a display of the mobile communication device to notify the user that the displayed frame is associated with the advertising messages. The alerting symbol may also be implemented as switching on a Light Emitting Diode (LED) or as changing of color of the diode.

BRIEF DESCRIPTION OF THE DRAWINGS

For a more complete understanding of the present invention and its various embodiments, and the advantages thereof, reference is now made to the following description taken in conjunction with the accompanying drawings, in which.

DETAILED DESCRIPTION

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefits of this disclosure.

Figure 1:
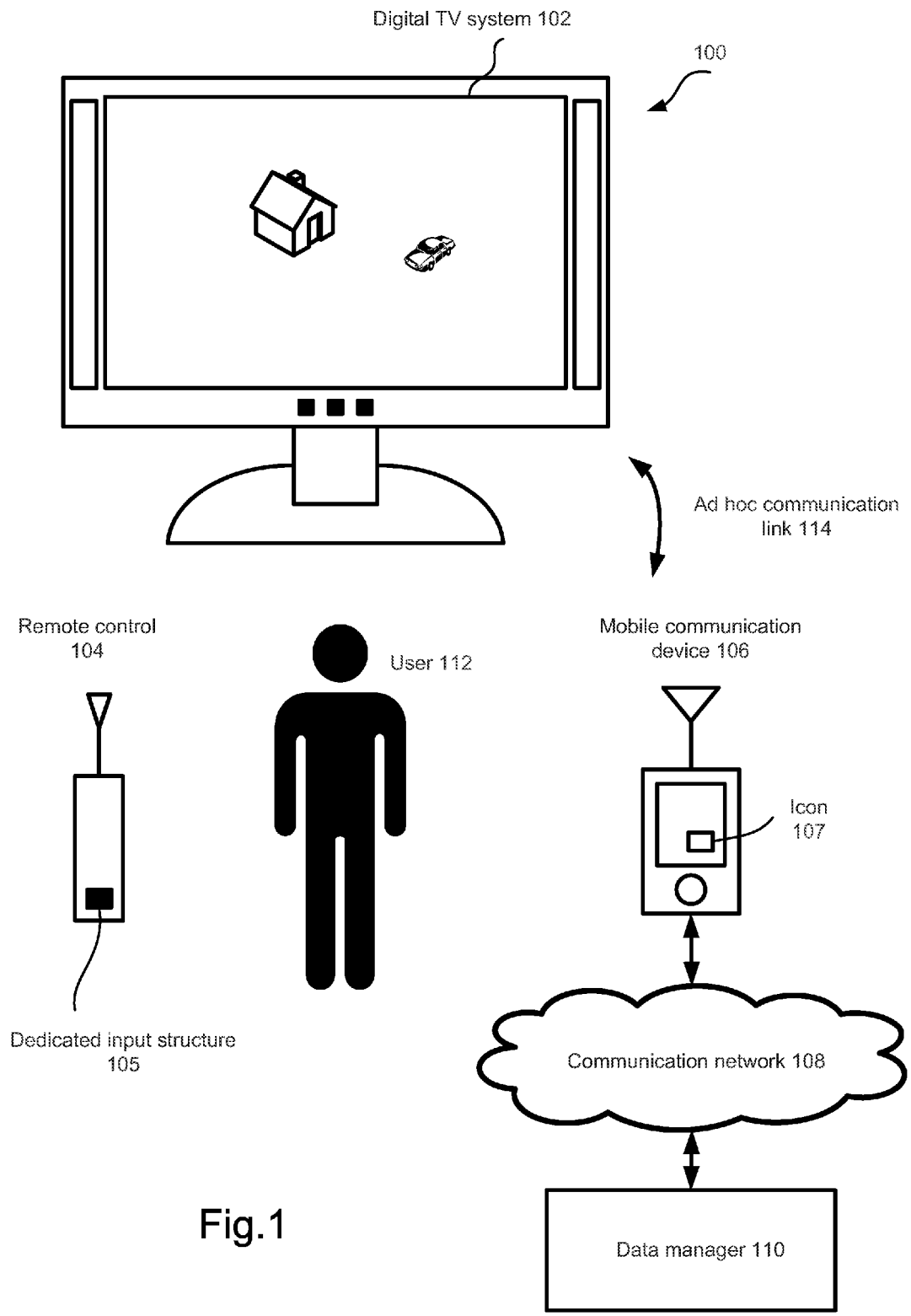
FIG. 1 is a schematic diagram of an advertisement delivery system based on a digital TV system and a mobile communication device in accordance to one embodiment.

FIG. 1 is a schematic diagram illustrating an advertisement delivery system according to one embodiment. The system 100 comprises a digital TV system 102 with a remote control device 104. The remote control device 104 may include a dedicated input structure 105 for controlling of selecting a displayed item. The input structure 105 may be a button, a touch pad or an icon in a touch sensitive display. The mobile communication device 106 may be a mobile phone with an Internet connection capability. The mobile device 106 is connectable to a data manger 110 through a public communication network 108. The public communication network 108 may the Internet. The mobile communication device 106 may include an icon 107 representing a commercial item selected by the user 112 on a displayed frame of a TV program. The remote control device 104 and the digital TV system 102 are connected through a well known method such as the Infrared communication interface in the art. The digital TV system 102 and the mobile device 106 may be connected using an ad hoc communication link 114. The ad hoc communication link 114 may be conformed to various IEEE and ISO standards and their extensions such as, for example, IEEE 802.15.1 (Bluetooth), IEEE 802.15.4 (ZigBee), IEEE 802.11x (WiFi) and ISO 18092, ISO 21481 and Transfer Jet Protocol for Near Field Communication (NFC).

Figure 2:
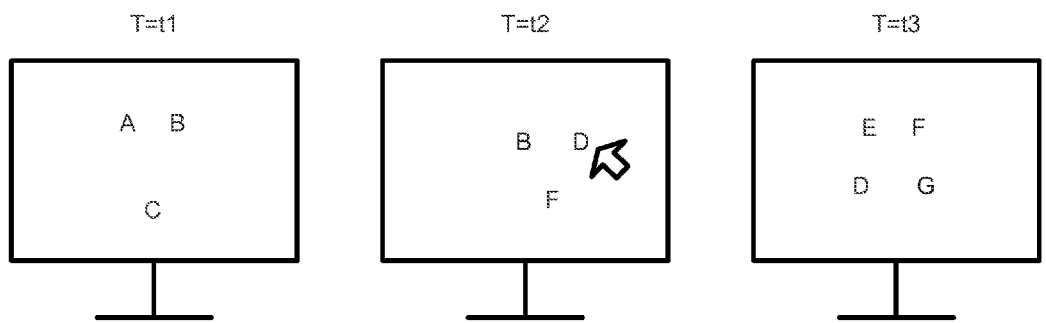
FIG. 2 is a schematic illustration that a series of frames are displayed during broadcasting of a program and displayed commercial items on the frames are linked to product identifiers and other advertisement files in a database.

FIG. 2 is a schematic illustration that a series of frames, being depicted as t1, t2 and t3 in an exemplary manner, are displayed on the top portion of the figure. Some of the displayed frames may include one or a number of commercial items. Some of the displayed frames may not include any commercial item. Each of the commercial items is linked to a product identifier as shown in the bottom portion of the figure. Some of the commercial items may also be linked to one or more advertisement files. Each program may have a different database. The database may be delivered from a server in a television network after a program is selected by the user. The database may be removed from the system after the completion of broadcasting the program.

When a user is attracted by a displayed item, he may use the remote control device 104 or the mobile device 106 to select the item. Upon the user's selection, a data file is generated including at least the product identifier of the selected item. The data file may be sent from the digital TV system 102 to the mobile device 106 through the ad hoc communication link 114.

The user may use the remote control device 104 and the mobile device 106 to move an optical mark such as a cursor on the screen of the digital TV system 102. After the item is pointed by the cursor, the user may use the dedicated input structure 105 to make the selection according to one implementation of the present invention. If the selected item does not have a product identifier or an advertisement message available in the database, a message may be displayed on the digital TV system 102 or on the display of the mobile device 106 to notify the user.

The user may also use the remote control device 104 or the mobile device 106 to get a still-standing frame before he makes a selection.

Figure 3A:
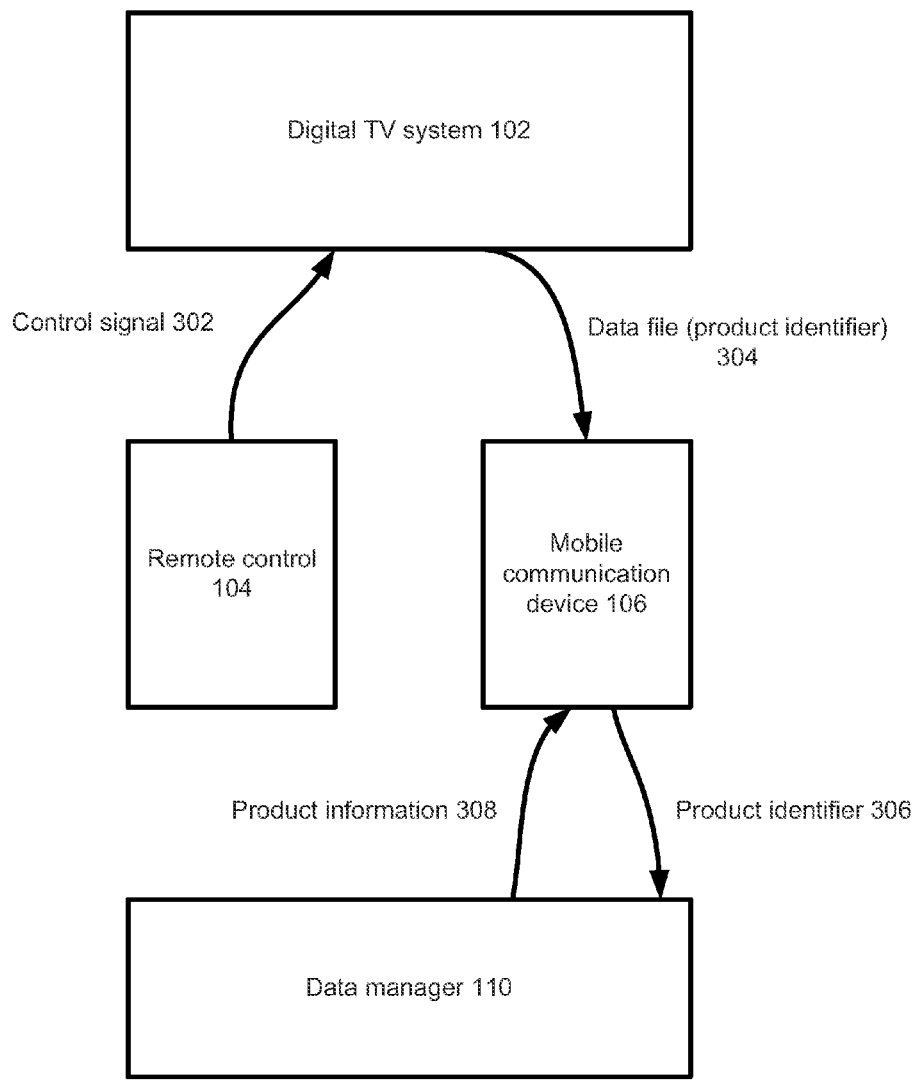
FIG. 3A is a schematic diagram of functional blocks and data flow of the system in accordance with one embodiment.

FIG. 3A is a schematic diagram of functional blocks and data flow of the system 100 in accordance with one embodiment. When a digital TV system 102 is used to broadcast a program, commercial items may be displayed at least on some of the frames of the program. When a user is attracted by a specific item on a displayed frame, he uses the remote control device 104 to make the selection. A control signal 302 is sent from the remote control device 104 to the digital TV system 102. Upon receiving the control signal 302, the digital TV system 102 sent a data file 304 to the mobile device 106. The received file is represented by an icon displayed on the display screen of the mobile device 106. If the icon is selected by the user 112, the product identifier 306 is sent to a data manager 110 through the Internet 108. The data manager 110 sends more detailed product information to the mobile device 106. The product information 308 may be presented using a web site displayed on the display screen of the mobile device 106. It should be noted that data file 304 sent from digital TV system 102 to the mobile device 106 may include contents other than the product identifier. For example, the data file may include a text message, an image, a voice message, video clip and a multimedia file related to the selected commercial item. The user may use the mobile device 106 to view the received advertising messages.

The remote control device 104 may include a dedicated input structure 105 for delivering the control signal 302. The dedicated input structure 105 may be a button, a touch pad, an icon in a touch sensitive screen or any other structure as known in the art. When the input structure is actuated, a processor in the remote control 104 receives the signal and sends the control signal to the digital TV system 102.

According to another implementation, one of the existing input structures of the remote control device 104 may be used to display a cursor on the screen of the digital TV system 102 After the selection using the remote control device 104, a control signal is generated to trigger the operation of sending the data file 304 to the mobile device 106.

Figure 3B:
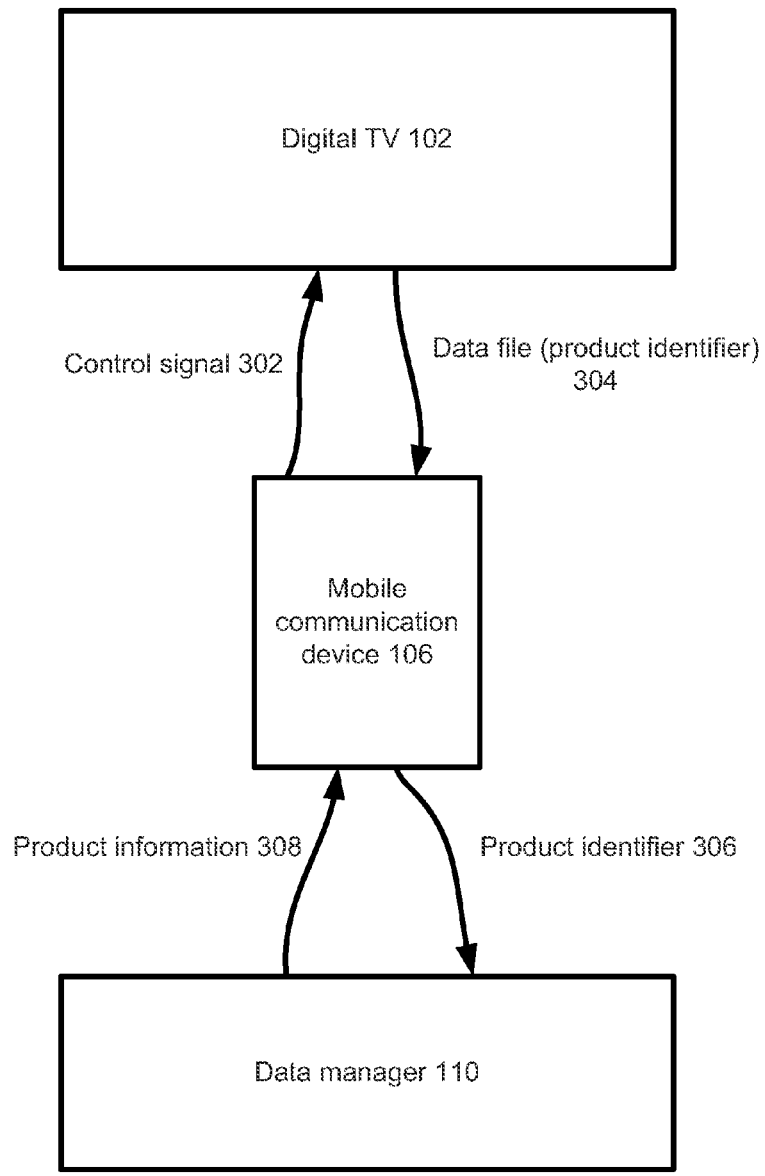
FIG. 3B is a schematic diagram of functional blocks and data flow of the system in accordance with another embodiment.

FIG. 3B is a schematic diagram of functional blocks and data flow of the system 100 in accordance with another embodiment. The mobile communication device 106 rather than the remote control device 104 is used to send the control signal 302 to the digital TV system 102. If the viewer is attracted by a displayed item, he may use the mobile device 106 to move an optical mark such as a cursor on the screen of the digital TV system 102. Upon the user's selection using the mobile device 106, a control signal 302 is sent to the digital TV system 102. The data file 304 is then sent to the mobile device 106. Similarly, the product identifier 306 may be sent to the data manger 112 and detailed product information 308 is sent to the mobile device 106 in a form of web site.

Figure 4A:
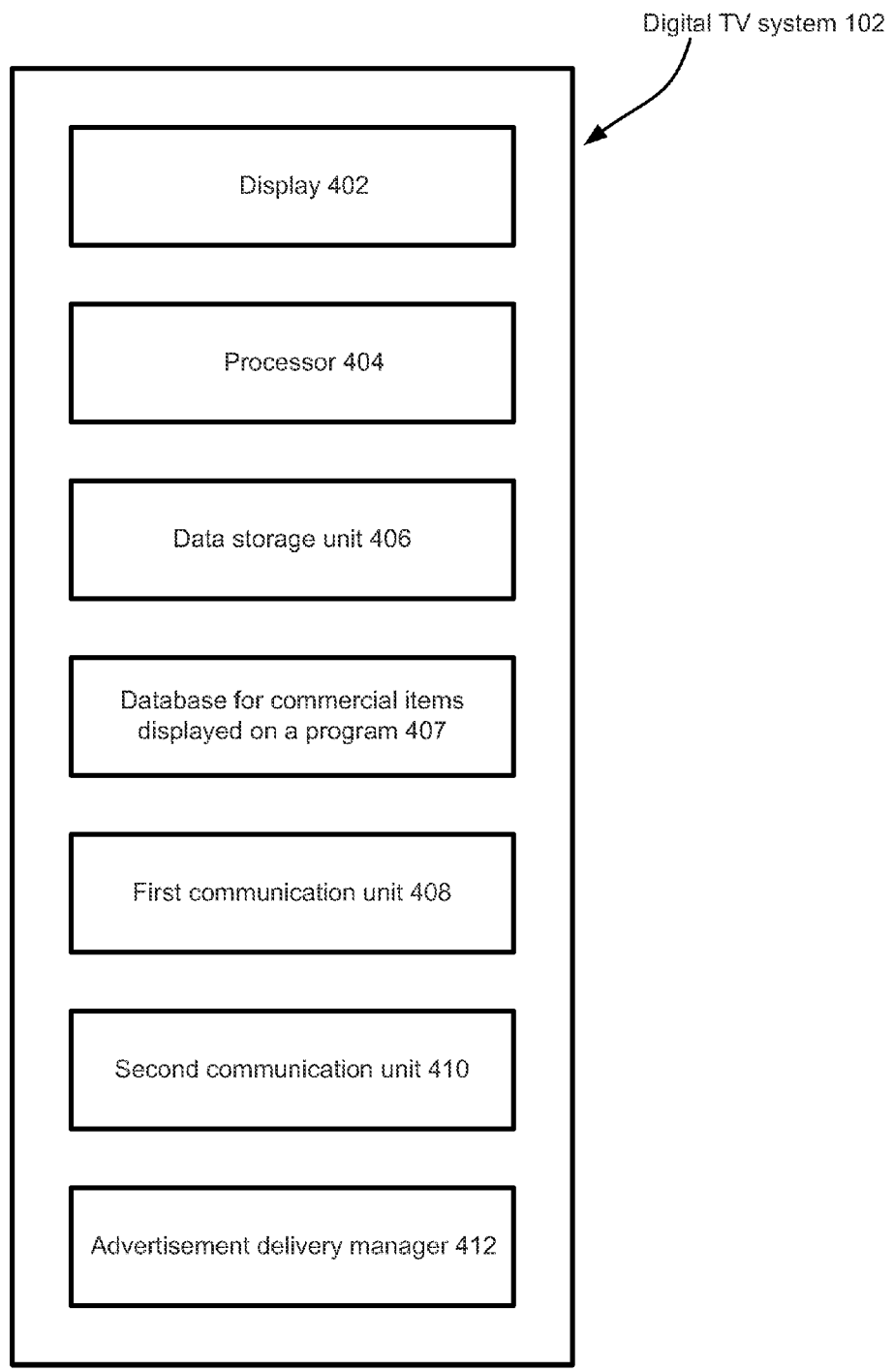
FIG. 4A is a schematic diagram of functional blocks of the digital TV system in accordance with one implementation.

FIG. 4A is a schematic representation of functional blocks of the digital TV system 102 in according with one embodiment. The system 102 comprises a display 402. The display may be a Liquid Crystal Display (LCD). The display may also be any other type of display as known in the art. A processor 404 is used to control the operation of the digital TV system 102. The processor 404 may include more than one type of processors including a general purpose processor such as a Central Processing Unit (CPU) and a special purpose processor such as a Graphical Processing Unit (GPU). The digital TV system 102 may also include a data storage unit 406 such as a magnetic storage unit and/or semiconductor memory devices. A database 407 is used to relate a displayed commercial item to a product identifier and/or to advertisement files.

The digital TV system 102 may be connected to a communication network through a first communication unit 408. The network may be a private broadband network for delivering TV programs. The network may also be a public network such as, for example, the Internet. A second communication unit 410 is used to connect the digital system 102 to the mobile device 106 through an ad hoc communication link 114. The ad hoc communication link 114 may be conformed to various IEEE and ISO standards and their extensions such as, for example, IEEE 802.15.1 (Bluetooth), IEEE 802.15.4 (ZigBee), IEEE 802.11x (WiFi) and ISO 18092, ISO 21481 and Transfer Jet Protocol for Near Field Communication (NFC). The digital TV system 102 may also include a third communication unit (not shown in the figure) for connecting the system and the remote control device 104. Most remote control devices today use Infrared communication interfaces.

An advertisement delivery manager 412 is used to control the operation of the advertisement delivery. It may be implemented as a software program to be executed by the processor 404. It may also be implemented as a combination of the software and the hardware.

Figure 4B:
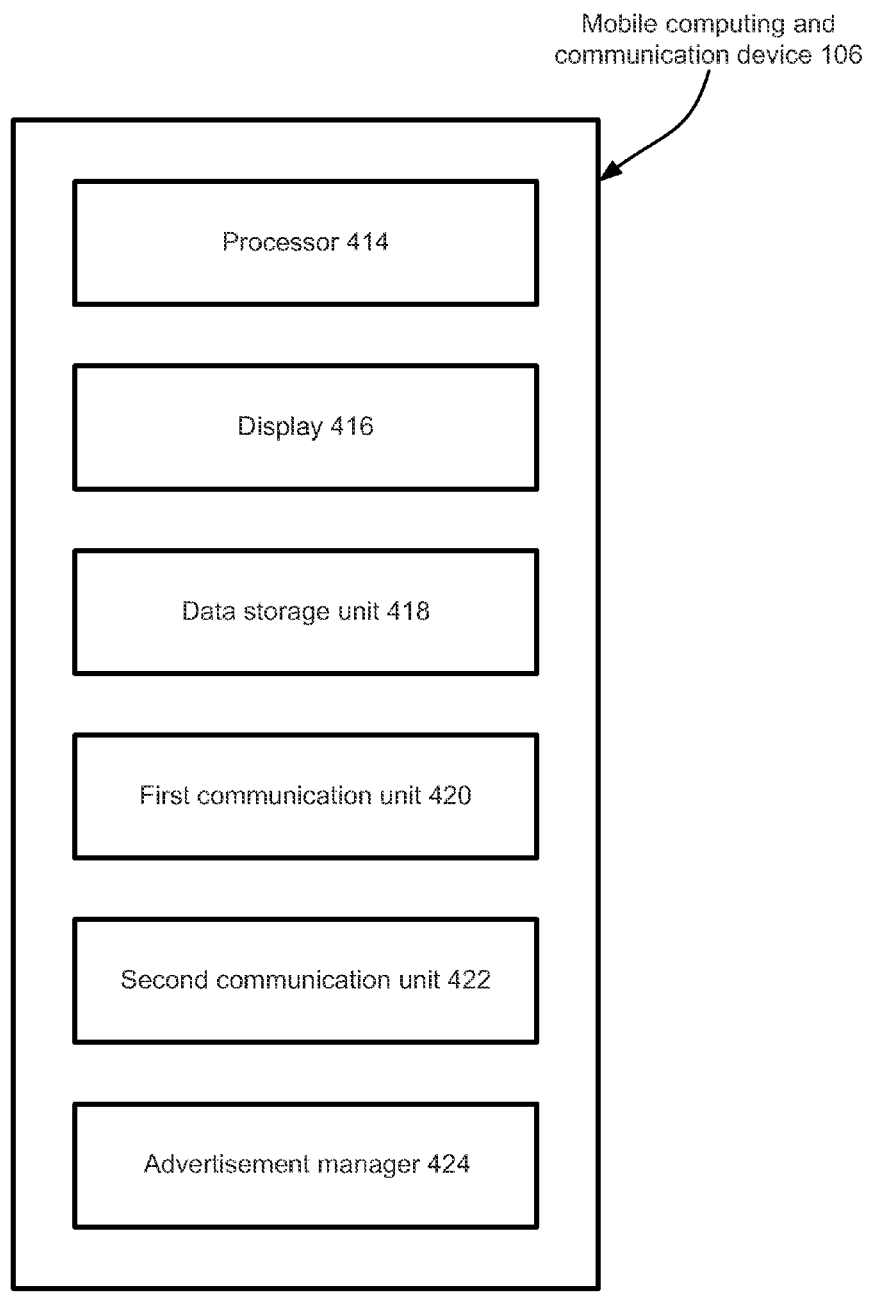
FIG. 4B is a schematic diagram of functional blocks of the mobile communication device in accordance with one implementation.

FIG. 4B is a schematic representation of functional blocks of the mobile communication device 106. The device 106 comprises a processor 414, a display 416, a data storage unit 418 and a first communication unit 420 as known in the art. The first communication unit 420 may be a standard network interface for a smart phone including a capability to connect to the Internet. The device 106 further comprises a second communication unit 422 for connecting to the digital TV system 102 through the previously mentioned ad hoc communication link 114. An advertisement manager 424 is used to control the operation of receiving the data file 304 and to display an icon to represent the received data file in an exemplary implementation.

Figure 5:
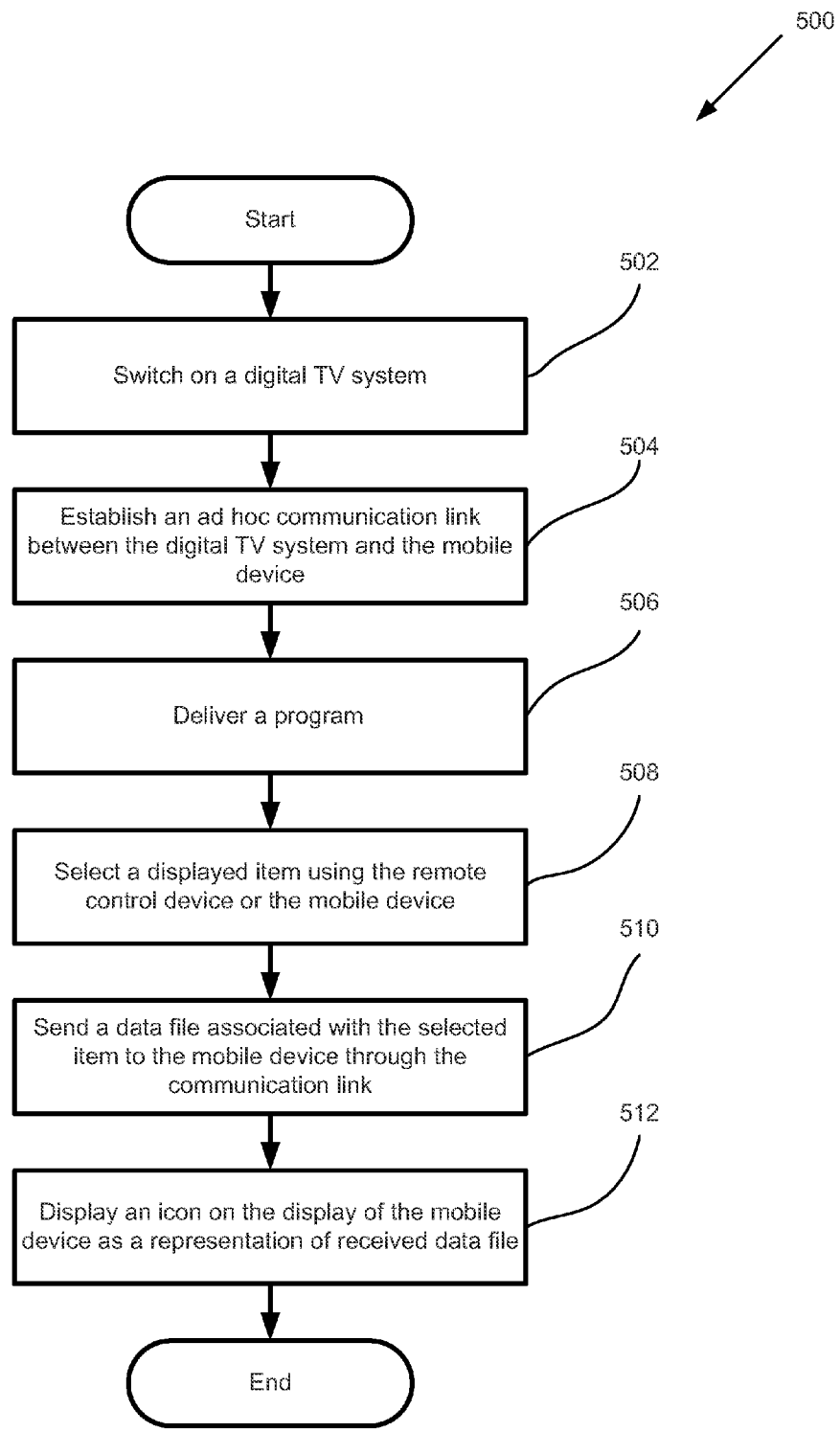
FIG. 5 is a flowchart illustrating an exemplary process that a user selects a displayed item and a data file including the product identifier is sent to the mobile device.

FIG. 5 is a flowchart illustrating an exemplary process that a user selects a displayed item and a data file 304 including the product identifier is sent to the mobile device 106. Process 500 begins with switching on the digital television system 102 in step 502. An ad hoc communication link 114 is established in step 504 between the digital TV system 102 and the mobile device 106. The communication link 114 may be a Bluetooth connection in an exemplary implementation. The communication link may also be a NFC including a RF tag in the digital TV system 102 and a reader in the mobile device 106 in another exemplary implementation. The data file 304 may be sent to the tag first before it is readout by the reader in the mobile device 106.

A TV program comprising a series of frames is selected and delivered in step 506. At least some of frames may include commercial items selectable by the user using the remote control device 104 or using the mobile device 106. Upon selection of the digital TV program, a database associated with the program is delivered from a server in the digital TV network to the digital TV system 102. The database may comprise product identifiers of displayed commercial items in the frames of the program. The database may also include other advertisement files related to the commercial items. The database may be delivered to digital TV system 102 in a single step. The database may be delivered to the system 102 in multiple steps according to the progress of broadcasting of the program.

During the broadcasting of the program, if the user is attracted by one of the displayed items, he may select the item using the remote control device 104 or the mobile device 106 in step 508. The data file 304 is then sent from the digital TV system 102 to the mobile device 106 in step 510 through the ad hoc communication link 114. The data file 304 may include the product identifier of the selected item. The data file 304 may also include related advertisement files for the selected item. The advertisement files may be in a text format, a voice format, an image format or a video and multimedia format. The data file 304 is generated by the advertisement delivery manager 412 upon the user's selection of the displayed item. An icon 107 representing the received data file 304 is displayed on the display screen of the mobile device 106 in step 512.

Figure 6:
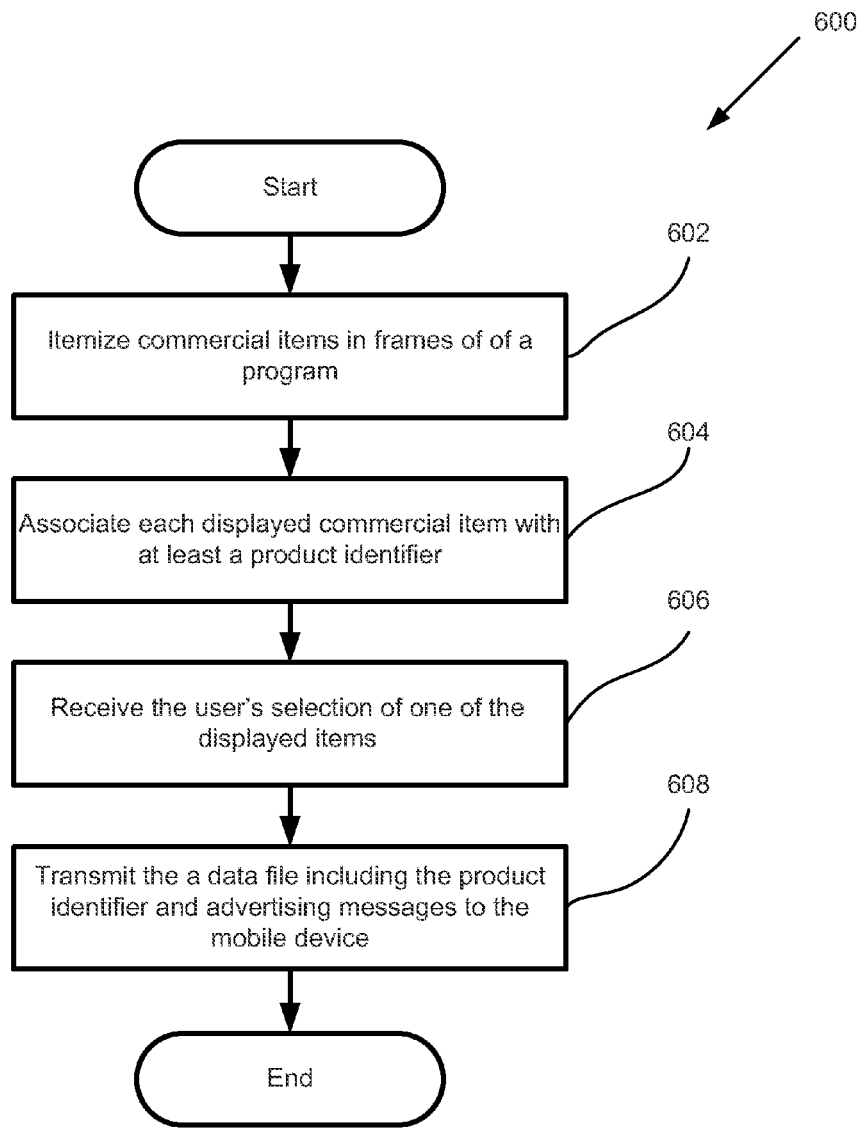
FIG. 6 is a flowchart illustrating an exemplary process that displayed items in a program are itemized and are sent to a user after the user's selection.

FIG. 6 is a flowchart illustrating an exemplary process that displayed items in a program are itemized and are sent to a user after the user's selection. Process 600 starts with step 602 that commercial items in all displayed frames of a digital TV program are itemized. Each item is associated with a product identifier in step 604. The product identifiers may be generated based upon a commonly accepted standard. When a frame is displayed, a displayed commercial item is defined by a zone on the display plane. When the user moves the optical mark such as a cursor into the zone, the user's action on an input structure of the remote control device 104 or the mobile device 106 generates a control signal in step 606. The control signal triggers an operation by the advertisement delivery manager 412 to create a data file 304 including the product identifier and/or the related advertisement files. The data file 304 is transmitted to the mobile device 106 in step 608.

Figure 7:
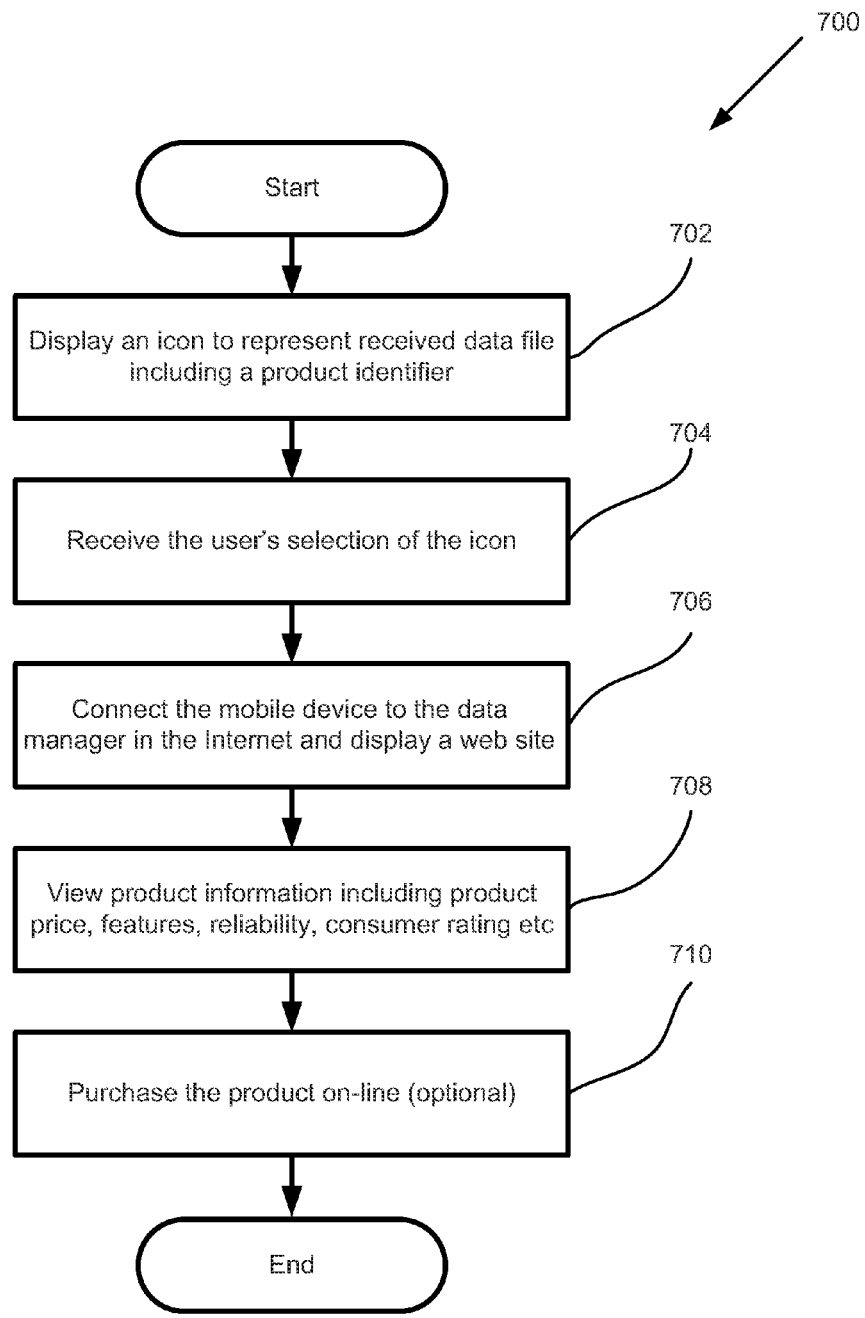
FIG. 7 is a flowchart illustrating an exemplary process that an icon is used to represent the received data file and more detailed information about the product is delivered from a data manager connected to the Internet.

FIG. 7 is a flowchart illustrating a process that detailed product information is sent to the mobile device 106 from the data manager 110 through the Internet 108. Process 700 starts with step 702 that the icon 107 representing the received data file 304 is displayed on the screen of the mobile device 106. The display may be a touch sensitive screen according to one implementation. The user (viewer) may touch the icon 107 in step 704 to request the detailed product information. The mobile device 106 and the data manager 110 are connected through the Internet 108 in step 706. The data manager 110 may be an operator to provide detailed product information upon a request. The data manager 110 may be connected to retailers, advertisers and consumer rating organizations. After they are connected, a web page may be displayed. The product information represented by the product identifier may be delivered to the user 112 in a hierarchical manner as known in the art. In step 708, the user may navigate through the user interface and find useful information related to the product. In step 710, the user may decide to purchase the product through an on-line facility after reviewing the product information.

The user's operation may be tracked and data may be collected and be sent back to the digital TV system 102. The advertisers may be paid based on which product identifiers are downloaded by the viewer and also by which product the user purchased through the on-line facility.

Figure 8:
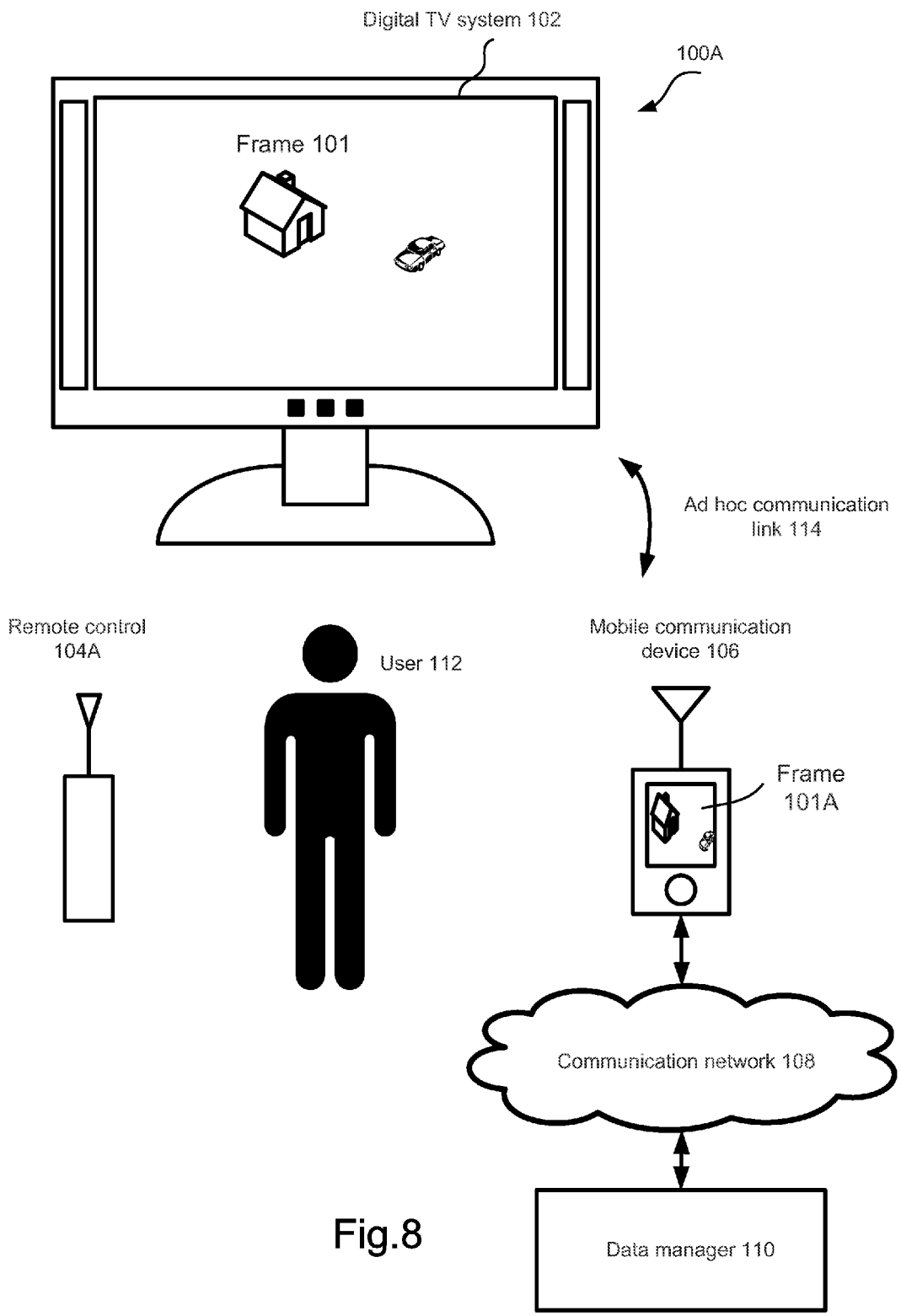
FIG. 8 is a schematic diagram of an advertisement delivery system based on a digital TV system and a mobile communication device through the use of a transmitted frame of a TV program.

FIG. 8 is a schematic diagram of an advertisement delivery system 100A in accordance with another embodiment. The TV program being broadcasted by the digital TV system 102 includes a plurality of frames displayed sequentially. An exemplary frame 101 is depicted in FIG. 8. User 112 actuates the mobile communication device 106 through an input device. In an exemplary case, user 112 touches an icon displayed on a touch-sensitive display to transmit a control signal to the digital TV system 102 through the ad hoc communication link 114. In response to the control signal, the digital TV system 102 transmits a data file to the mobile communication device 106. The data file includes data related to the frame 101 and advertising messages related to displayed items in the frame 101. A processor 414 in the mobile device 106 redisplays the frame 101 on the display of the mobile device 106 as a new frame 101A. The advertising messages received by the mobile device 106 can be stored in the data storage unit 406 of the mobile device 106. The advertising messages include but are not limited to images, texts, product identifiers, links to websites and video programs.

In another embodiment, remote control 104A can be employed to send a control signal to the digital TV system 102. In response to the control signal, the data file including the frame 101 and the associated advertising message is transmitted from the digital TV system 102 to the mobile communication device 106.

In yet another embodiment, the remote control device 104A and the mobile communication device 106 are connected through an ad hoc communication link. Further, the digital TV system 102, the remote control 104A and the mobile communication device 106 can form an ad hoc communication network.

In still another embodiment, the ad hoc communication link 114 can only be established if control signals from the remote control device 104A are received by the digital TV system 102 and the mobile communication device 106.

In still another embodiment, the mobile communication device 106 transmits a user's identification to the digital TV system 102. The ad hoc communication link 114 can only be established after the identity of the user of the mobile communication device 106 is verified.

All such variations fall into scopes of the present inventive concept.

Figure 9A:
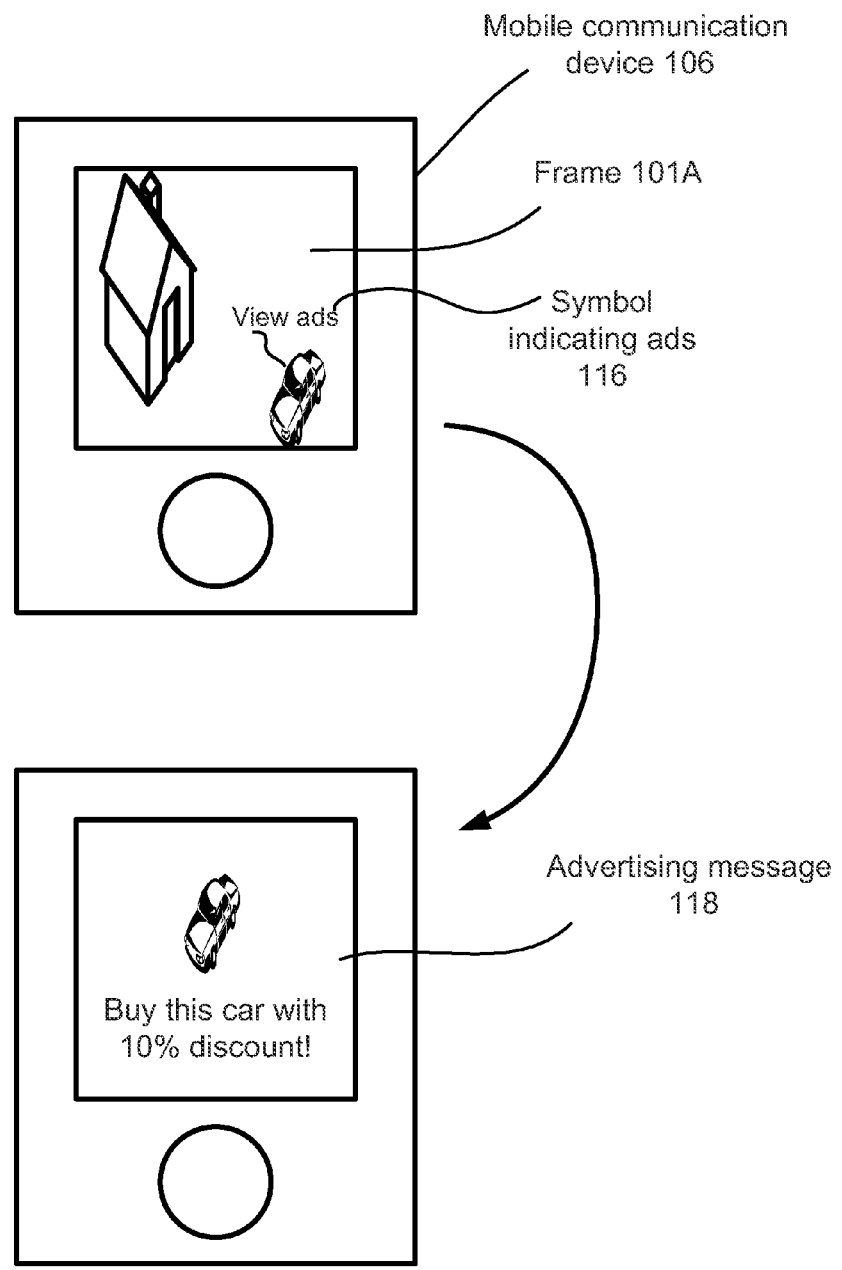
FIG. 9A is a schematic diagram illustrating an advertising message is rendered through the mobile device by redisplaying the frame on the device in one implementation.
Figure 9B:
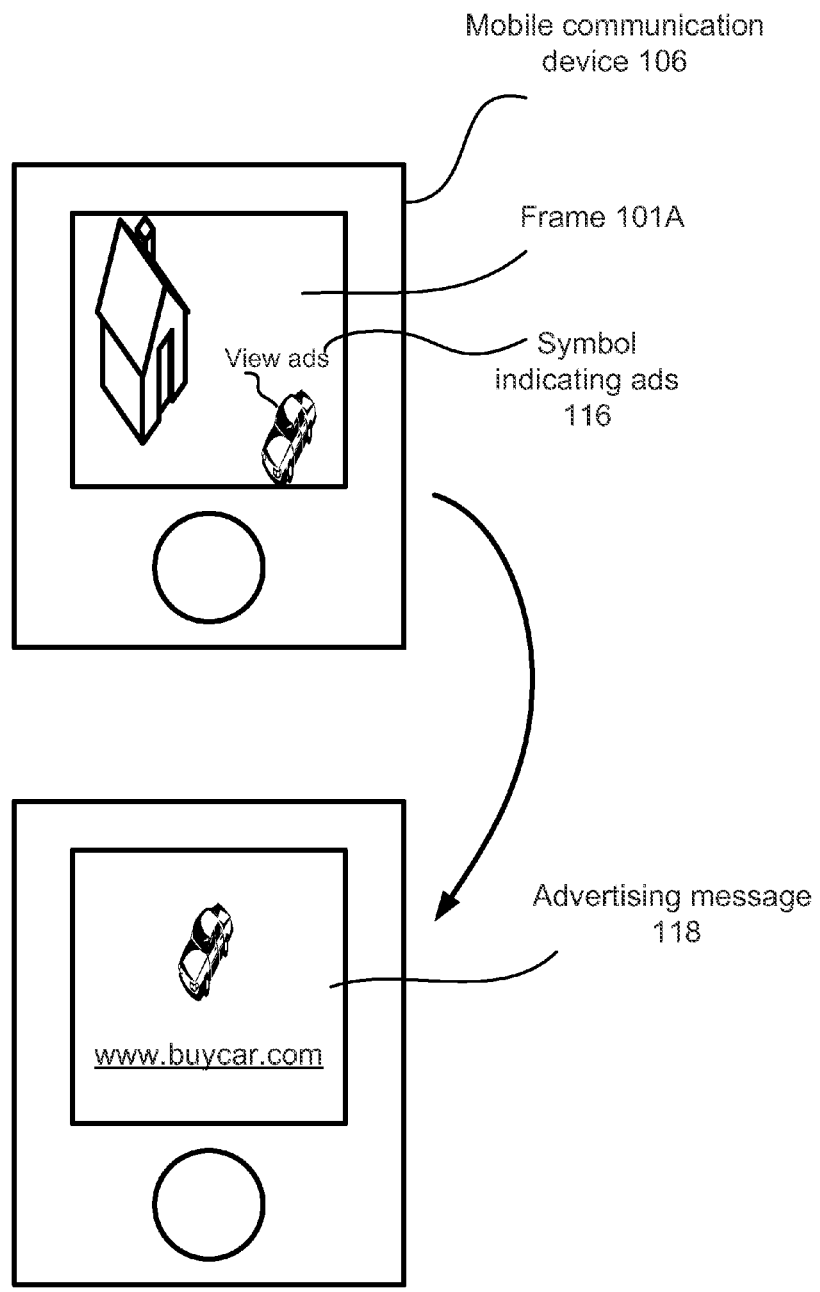
FIG. 9B is a schematic diagram illustrating an advertising message is rendered through the mobile device by redisplaying the frame on the device in another implementation.

The displayed frame 101A includes visible symbol 116 pointing to the displayed items associated with the advertising messages as shown in FIG. 9A. In an exemplary case, the user touches symbol 116 to select to view the advertising message 118. The displayed frame 101A is then replaced by an advertising message page as illustrated in FIG. 9A. In another implementation, as shown in FIG. 9B, a link to a website is displayed on the screen of the mobile device 106. The user can select the link to access the website that provides detailed contents of the advertising message 118. In yet another implementation, the link to the website may be displayed directly on frame 101A. In even another implementation, a product identifier may be displayed that leads to more detailed contents of the advertising message 118. In still another implementation, a video program related to the advertising message may be rendered upon the user's selection of symbol 116 or the item pointed or marked by the visible symbol 116.

Figure 10:
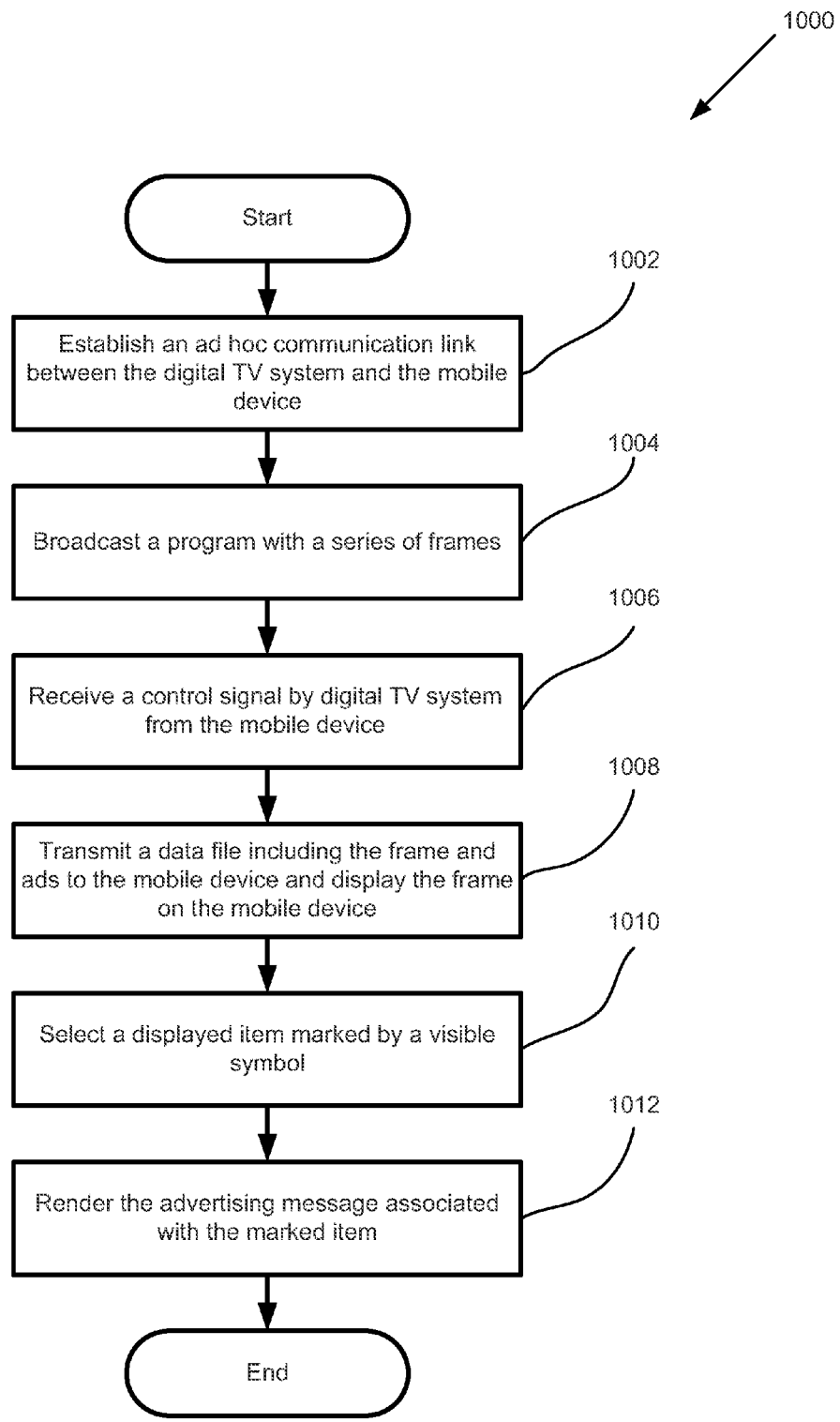
FIG. 10 is a flowchart illustrating an exemplary process that an advertising message is rendered through the use of the frame transmitted from the digital TV to the mobile device.

FIG. 10 is a flowchart illustrating an exemplary process 1000 that an advertising message is rendered through the use of the frame 101 transmitted from the digital TV system 102 to the mobile device 106. Process 1000 starts with a step 1002: an ad hoc communication link 114 is established between the digital TV system 102 and the mobile device 106. The ad hoc communication link 114 may be conformed to various IEEE and ISO standards and their extensions such as, for example, IEEE 802.15.1 (Bluetooth), IEEE 802.15.4 (ZigBee), IEEE 802.11x (WiFi) and ISO 18092, ISO 21481 and Transfer Jet Protocol for Near Field Communication (NFC). A TV or video program is broadcasted in step 1004. The program includes a plurality of frames delivered in a sequential manner as known in the art. User 112 views the program and may be intrigued by displayed items in one of the frames. For example, user 112 may be attracted by an automobile displayed on the digital TV system 102.

User 112 actuates an input device of mobile device 106. In an exemplary case, user 112 touches an icon on a touch-sensitive display of the mobile device 106. In response to the user's action, a control signal transmitted from the mobile device 106 is received by the digital TV system 102 in step 1006. The frame 101 being displayed may be frozen by the digital TV system 102 in accordance with one implementation. The frame 101 being displayed may be selected but not be frozen in accordance with another implementation. A data file including data for frame 101 and associated advertising messages is transmitted from the digital TV system 102 to the mobile device 106 in step 1008. The mobile device 106 redisplays the frame 101 as a new frame 101A on its display. The visible symbol 116 is displayed pointing to the displayed item associated with the advertising message. User 112 selects the item in step 1010 through the input device. Advertising message 118 associated with the marked item by the symbol 116 is rendered accordingly in step 1012 as described in FIGS. 9A-B exemplarily.

Figure 11:
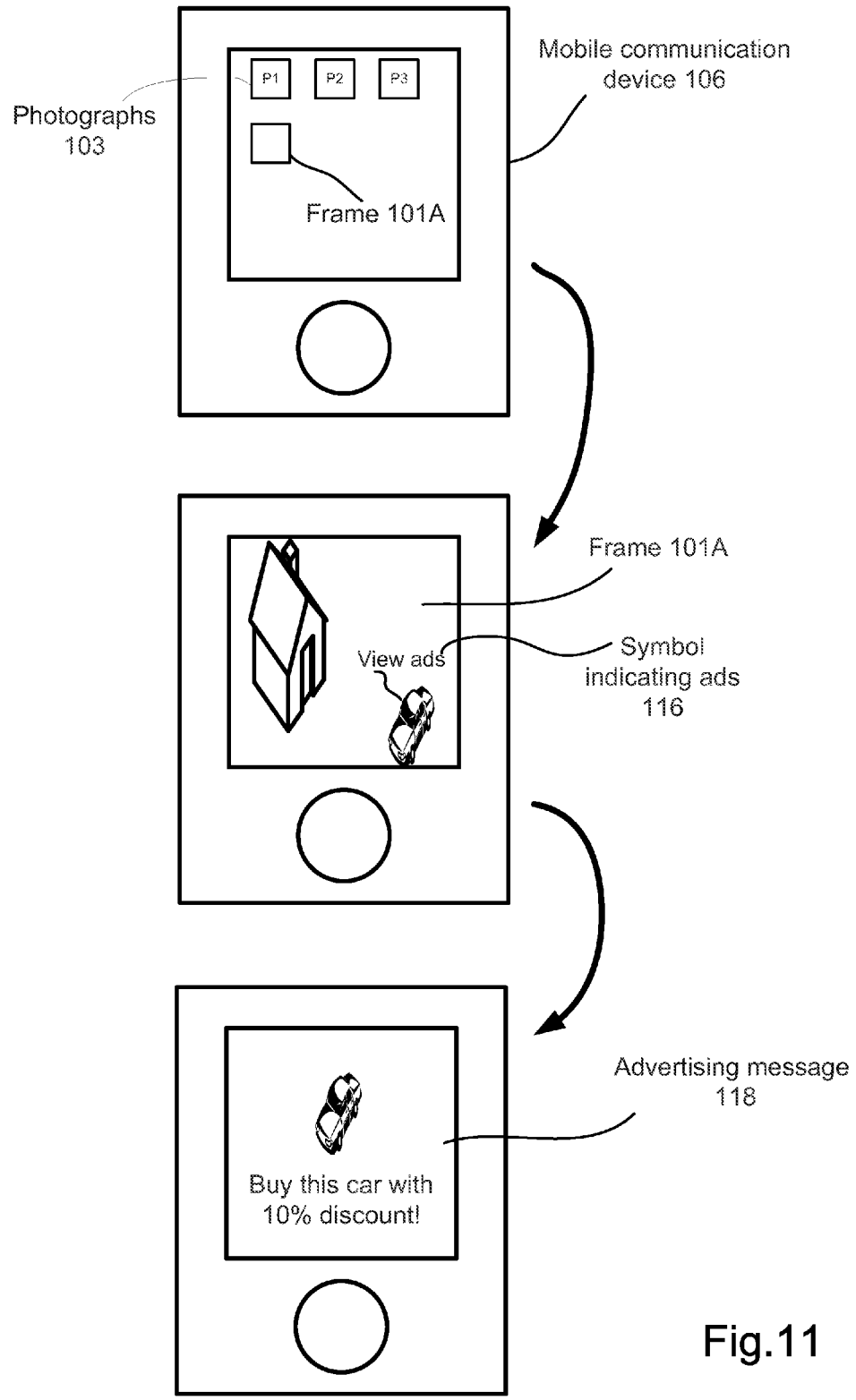
FIG. 11 is a schematic diagram illustrating received frame is stored in a folder and an advertising message is rendered accordingly.

FIG. 11 is a schematic diagram illustrating received frame 101A is stored in a folder by mobile device 106. User 112 may access the frame and its associated advertising messages in a later time. In one implementation, the folder is for storing photographs 103. P1, P2 and P3 are illustrated as exemplary photographs stored in the folder. Frame 101A can be stored in the folder in a similar manner as a photograph. The folder may be represented by an icon in the first display screen of the mobile device 106A. In another implementation, the folder may also be a dedicated folder for frames received from the digital TV system 102. User 112 selects to view the frame through actuating an input device of the mobile device 106. Frame 101A is then redisplayed on the screen of the mobile device 106 with the visible symbol 116 pointing to the item associated with the advertising messages. Detailed contents can be further reveled upon user 112's selection of the item. In an exemplary case, user 112 touches the touch-sensitive display to select the frame 101A. The frame will be redisplayed in a larger size including redisplayed in a full screen.

Figure 12:
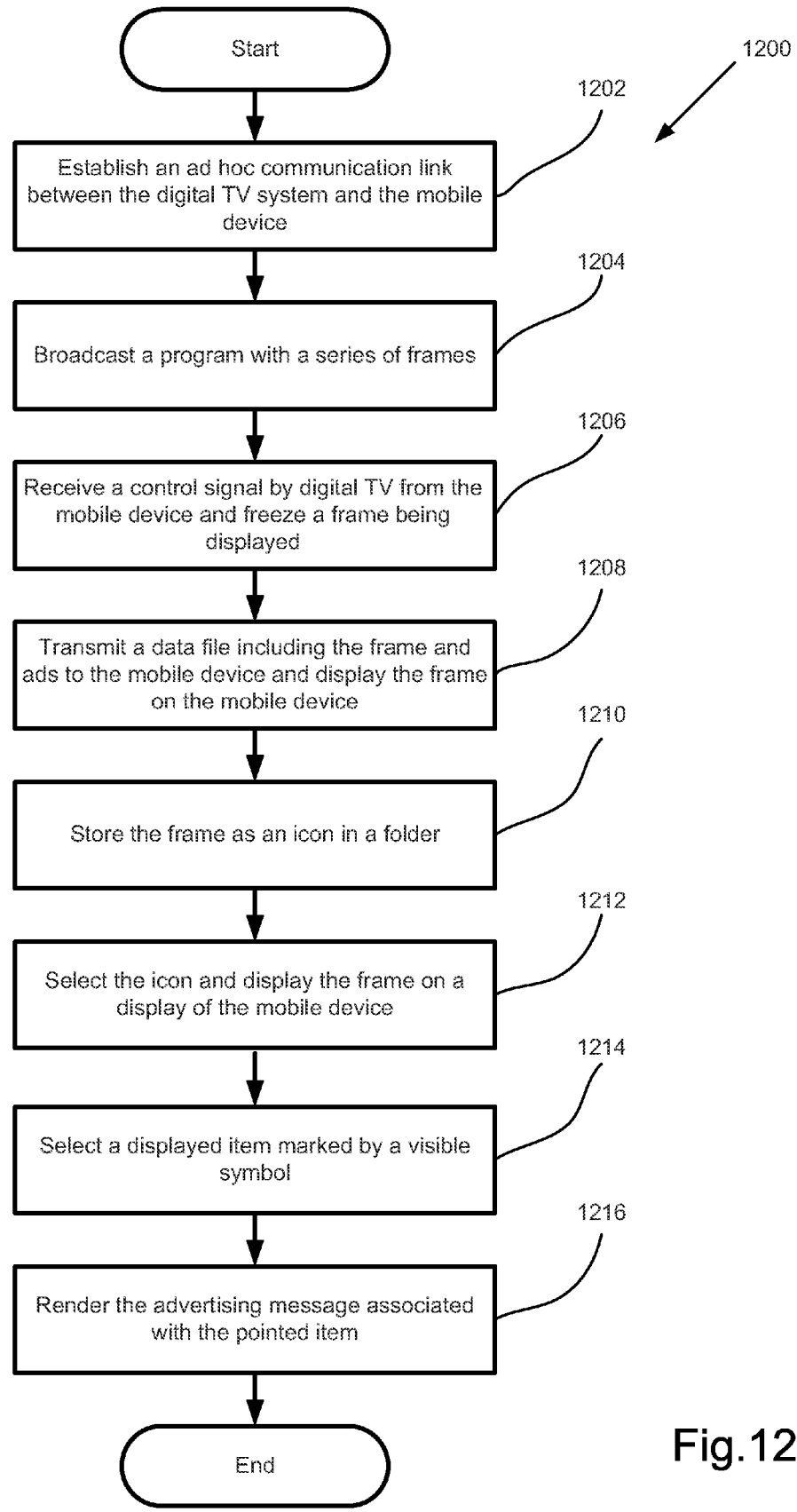
FIG. 12 is a flowchart illustrating an exemplary process that an advertising message is rendered through the use of the frame stored in the folder.

FIG. 12 is a flowchart illustrating an exemplary process 1200 that a frame is transmitted from the digital TV system 102 to the mobile device 106 and is stored in a folder. Process 1200 starts with step 1202: an ad hoc communication link 114 is established between digital TV system 102 and mobile device 106. The ad hoc communication link 114 may be conformed to various IEEE and ISO standards and their extensions such as, for example, IEEE 802.15.1 (Bluetooth), IEEE 802.15.4 (ZigBee), IEEE 802.11x (WiFi) and ISO 18092, ISO 21481 and Transfer Jet Protocol for Near Field Communication (NFC). A TV or video program is broadcasted in step 1204. The program includes a plurality of frames to be displayed in a sequential manner as known in the art. User 112 views the program and may be intrigued by displayed items in one of the frames. For example, user 112 may be attracted by an automobile displayed on digital TV system 102.

User 112 actuates an input device of the mobile device 106. In an exemplary case, user 112 touches an icon on a touch-sensitive display of the mobile device 106. In response to the user's action, a control signal transmitted from the mobile device 106 is received by digital TV system 102 in step 1206. The frame 101 being displayed may be frozen by the digital TV system 102 in accordance with one implementation. The frame 101 being displayed may be selected but not be frozen in accordance with another implementation. A data file including data for frame 101 and associated advertising messages is transmitted from the digital TV system 102 to the mobile device 106 in step 1208.

The mobile device 106 stores received frame 101A in a folder in step 1210. In a preferred implementation, the folder is the folder for the photographs. The folder may also be any other folders including a folder dedicated for storing received frames. Frame 101A may be displayed as an icon similar to a typical photograph in the folder for the photographs. User 112 may decide to view the frame 101A and associated advertising message is a later time. In step 1212, user 112 selects the icon representing the frame 101A. In response to the user's selection, the mobile device 106 displays frame 101A on its display screen. 101A is typically displayed with a larger size or even in a full screen manner. The visible symbol 116 is displayed pointing to the displayed item associated with the advertising message. User 112 selects the item in step 1214 through the input device. Advertising message 118 is rendered accordingly in step 1216 as described in FIGS. 9A-B exemplarily.

Figure 13A:
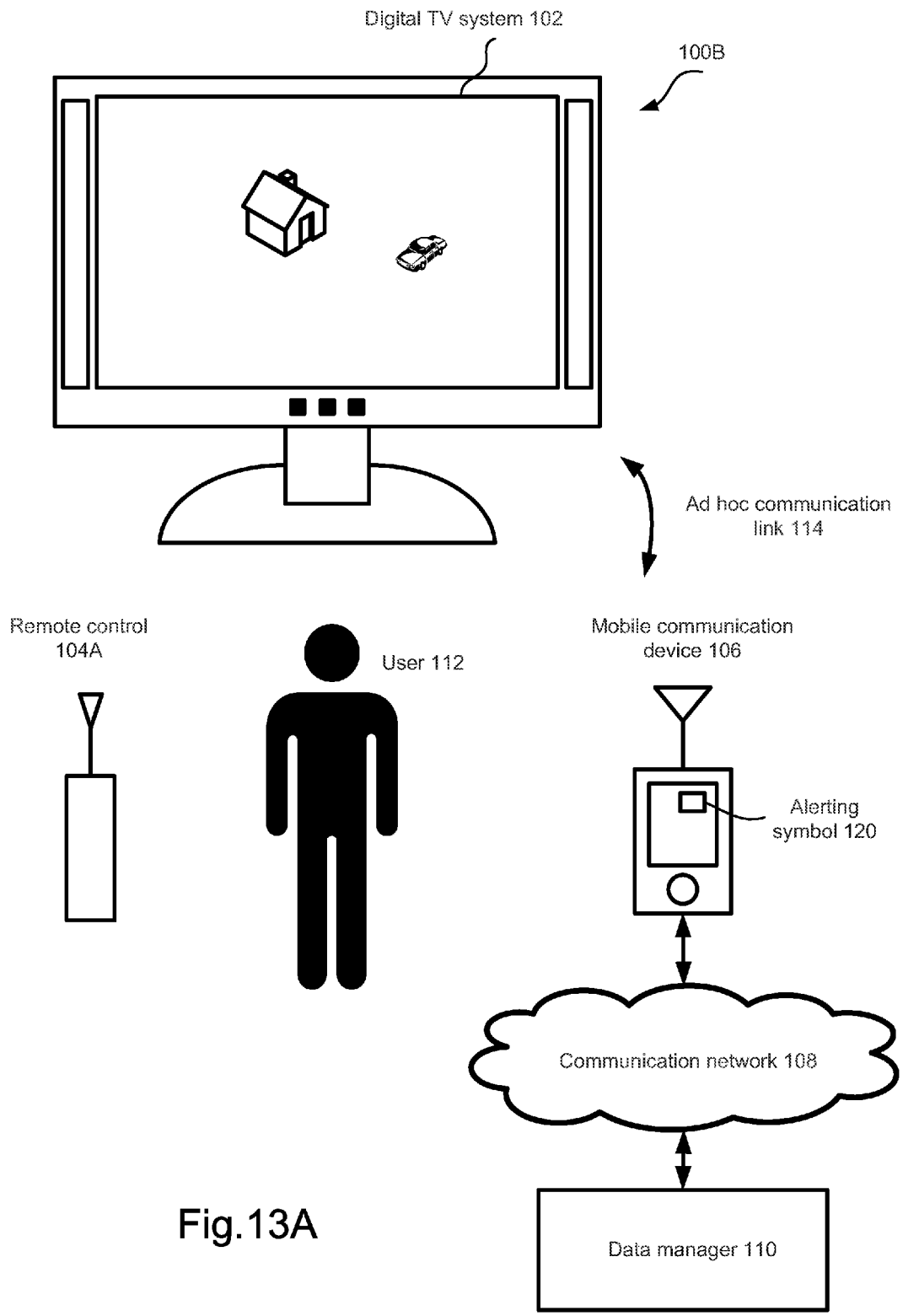
FIG. 13A is a schematic diagram of an advertisement delivery system based on a digital TV system and a mobile communication device with an alerting symbol displayed on the mobile device indicating availability of the advertising messages.
Figure 13B:
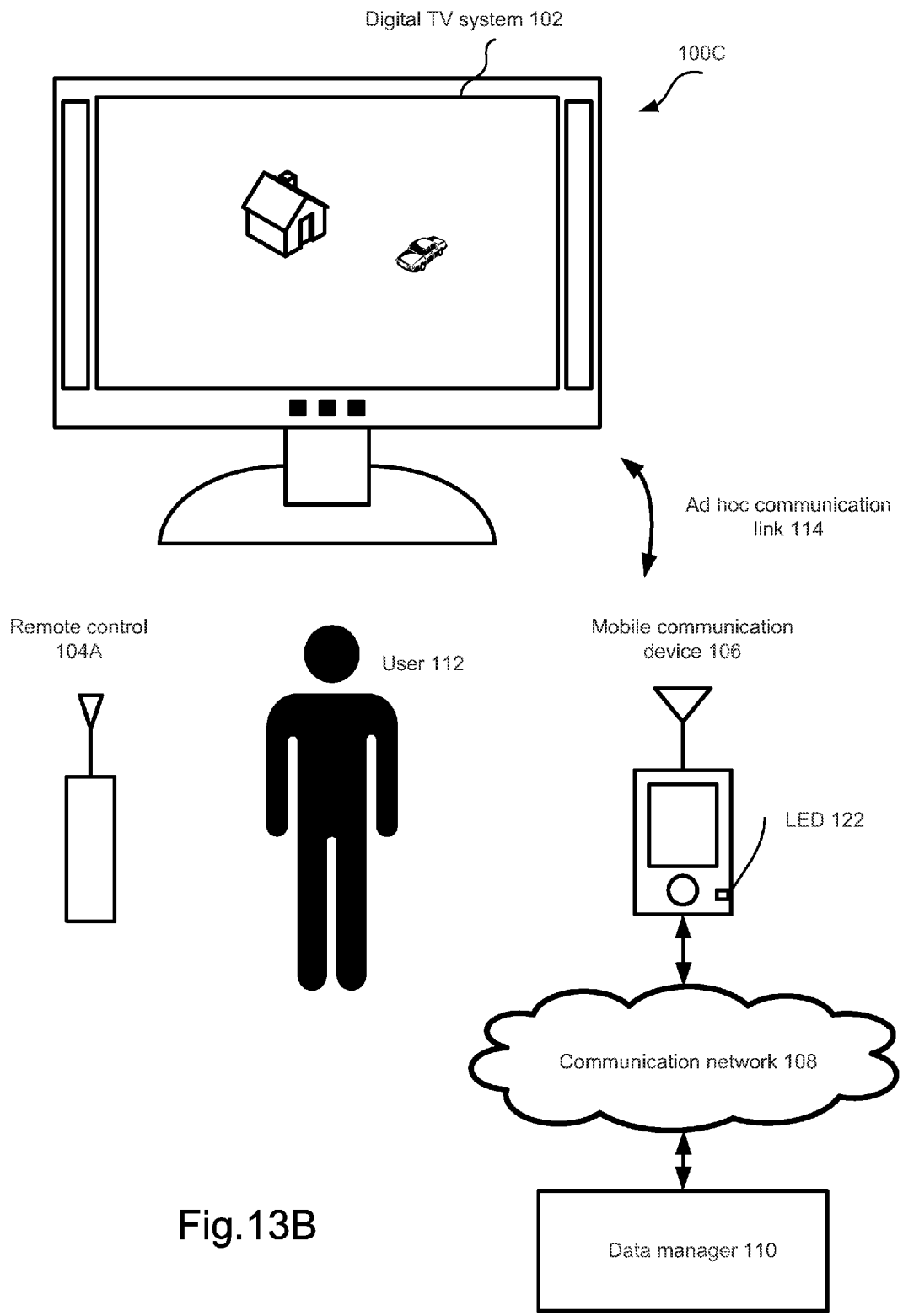
FIG. 13B is a schematic diagram of an advertisement delivery system based on a digital TV system and a mobile communication device with a LED employed to indicate availability of the advertising messages.

FIG. 13A is a schematic diagram of an advertisement delivery system 100B based on a digital TV system 102 and a mobile communication device 106 in accordance with another embodiment. A TV program being broadcasted by digital TV system 102 includes a plurality of frames displayed in a sequential manner. Some of the frames include displayed items associated with advertising messages stored in the data storage unit 406 of the TV system 102. In one implementation, a signal is transmitted from the digital TV system 102 to mobile device 106 when the frame being displayed includes the displayed items associated with the advertising messages. An alerting symbol 120 is displayed on the display of mobile device 106 after the signal is received by the mobile device 106. In another implementation as shown in FIG. 13B, a LED 122 can also be used to indicate that the signal has been received by the mobile device 106 and the advertising messages associated with the displayed are ready for viewing. LED 122 may be switched on from an off state to alert the user. A color of LED may be changed to alert the user.

User 112 notes the alerting symbol 122 can use mobile device 106 to send a control signal to digital TV system 102. A data file including the frame 101 and the advertising messages can then be sent to mobile device 106 and be rendered by employing the mobile device 106.

The alerting symbol 120 may be displayed with a voice signal. The alerting signal 120 may also be displayed with animations to attract the user's attention.

The alerting symbol 120 may also be a text message delivered to the mobile device 106.

In another embodiment, the digital TV system 102 rather than the mobile device 106 displays an alerting symbol. The alerting symbol may be displayed at any position of the display screen of the digital TV system 102. The alerting symbol may be displayed with animations to attract the user's attention. The digital TV system may also include a LED to indicate the availability of the advertising messages associated with the displayed items in the frame being displayed. The LED may be switched to deliver the alerting signal. The color of the light may be changed to alert the user.

Figure 14:
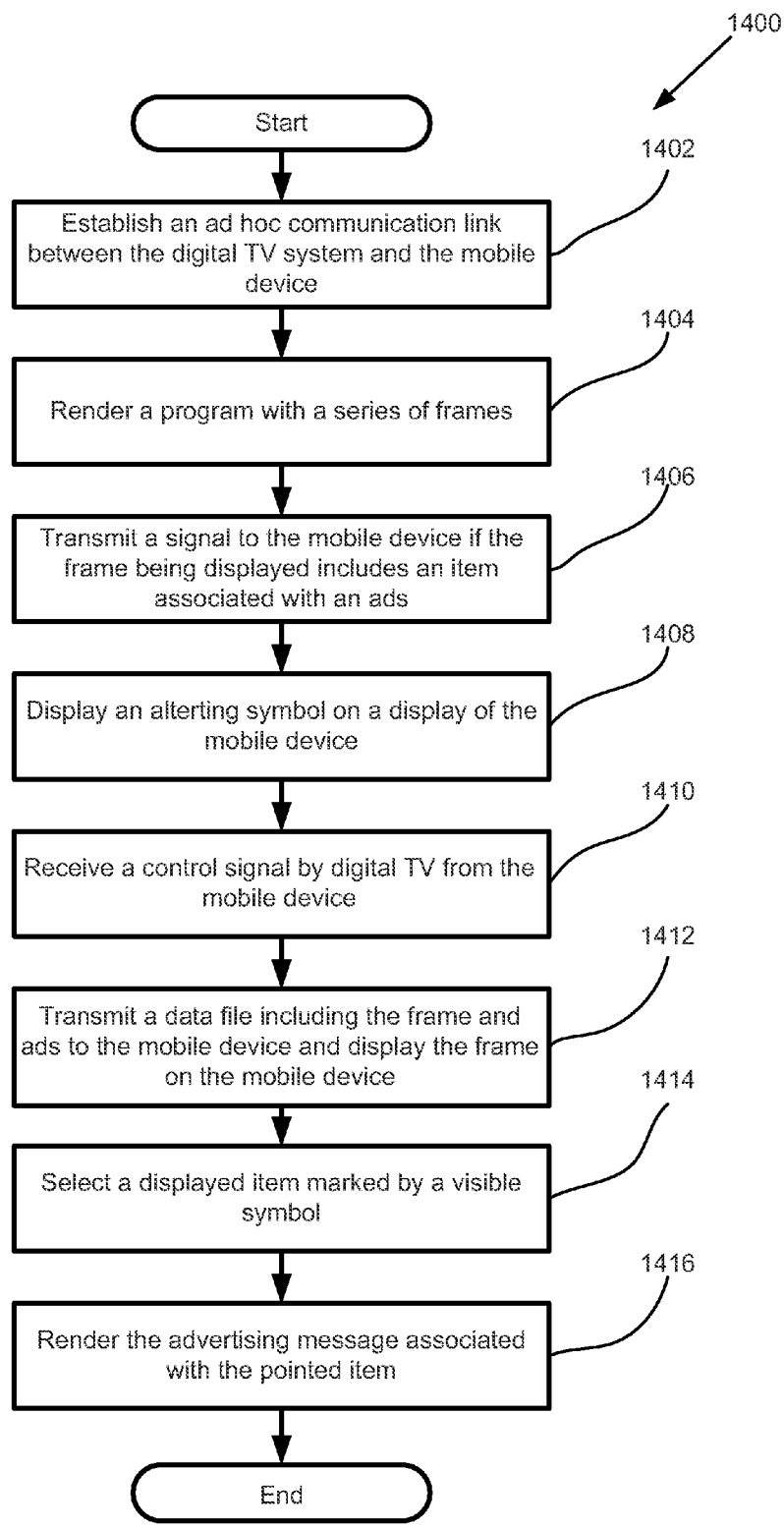
FIG. 14 is a flowchart illustrating an exemplary process that an advertising message is rendered through the use of the alerting symbol in the mobile device for indicating the availability of the advertising messages.

FIG. 14 is a flowchart illustrating an exemplary process 1400 that an advertising message is rendered through the use of the alerting symbol 120 in the mobile device 106 to indicate the availability of the advertising messages. Process 1400 starts with step 1402: an ad hoc communication link 114 is established between the digital TV system 102 and the mobile device 106. The ad hoc communication link 114 may be conformed to various IEEE and ISO standards and their extensions such as, for example, IEEE 802.15.1 (Bluetooth), IEEE 802.15.4 (ZigBee), IEEE 802.11x (WiFi) and ISO 18092, ISO 21481 and Transfer Jet Protocol for Near Field Communication (NFC). A TV or video program is broadcasted in step 1404. The program includes a plurality of frames displayed in a sequential manner as known in the art. Some of the frames may include displayed items associated with the advertising messages. A signal is transmitted from the digital TV system 102 to the mobile device 106 in step 1406 to notify the mobile device 106 that advertising messages related to the items currently being displayed are available for viewing. In step 1408, an alerting symbol is displayed on the display of mobile device 106. In another implementation, LED 122 is used to indicate the availability of the advertising messages.

User 112 notes the alerting symbol 120 and may be intrigued by displayed items in one of the frames. For example, user 112 may be attracted by an automobile displayed on digital TV system 102.

User 112 actuates an input device of the mobile device 106. In an exemplary case, user 112 touches an icon on a touch-sensitive display of the mobile device 106. In response to the user's action, a control signal transmitted from the mobile device 106 is received by digital TV system 102 in step 1410. The frame 101 being displayed may be frozen by digital TV system 102 in accordance with one implementation. The frame 101 being displayed may be selected but not be frozen in accordance with another implementation. A data file including data for frame 101 and associated advertising messages is transmitted from the digital TV system 102 to the mobile device 106 in step 1412. The mobile device 106 redisplays frame 101 as a new frame 101A on its display. Visible symbol 116 is displayed pointing to the displayed item associated with the advertising message. User 112 selects the item in step 1414 through the input device. Advertising message 118 is rendered accordingly in step 1416 as described in FIGS. 9A-B exemplarily.

In another implementation, the digital TV system 102 includes a set top box connected to a network. The network may be the Internet in one implementation and the network may be a cable based digital TV distribution network in another implementation.

In another implementation, the advertising messages are stored in the set top box. The advertising messages can also be stored in the network or in the cloud and be delivered to the digital TV system if they are demanded by the user.

The digital TV system may be located in a private area. The digital TV system may also be located in a public area.

The use of the digital TV system is exemplary. The present inventive concept can be extended to a movie delivery system in a movie theater. There is no conceptual difference between a digital TV system and a movie delivery system in the scope of the present inventive concept.

The mobile communication device can take various forms that include but are not limited to a smart phone, a tablet computer, a laptop computer, a netbook, a handheld media player, a digital camera and a game console.

In another implementation, more than one frame may be delivered to the mobile communication device in a single event of delivering the control signal from the mobile communication device to the digital TV system. Received frames may be redisplayed one by one or be displayed concurrently on the display of the mobile communication devices. The received multiple frames may also be stored as multiple icons in the folder such as, for example, the folders for storing the photographs. The multiple frames may also be represented by a single icon stored in the folder.

In another implementation, the alerting signal can be delivered as a vibration event of the mobile communication device. The vibration event may be accompanied with sound signals.

In another implementation, the folder for storing the received frame is a folder in the cloud and can be accessed by different computing and communication devices through the cloud. The advertising messages can also be accessed by the different devices through the cloud.

The invention claimed is:

1. A method of delivering an advertising message to a mobile computing and communication device, comprising:
   a. establishing an ad hoc communication link between a digital television system and the mobile device;
   b. broadcasting a program comprising a series of frames by the television system;
   c. receiving by the television system a control signal from the mobile device;
   d. freezing a frame being displayed by the television system, said frame further including a plurality of displayed items, at least one of the displayed items is associated with an advertising message stored in a data storage unit of the television system;
   e. transmitting a data file including said frame and said associated advertising message from the television system to the mobile device;
   f. displaying said frame on a display of the mobile device, said displayed item is marked with a visible symbol indicating that said displayed items are associated with the advertising message;
   g. selecting said displayed item by a user through actuating an input device of the mobile device; and
   h. rendering the advertising message to the user through the mobile device.

2. The method as recited in claim 1, wherein said advertising message further comprises a link to a website, said website further including detailed contents of the advertising message.

3. The method as recited in claim 1, wherein said advertising message further includes an image.

4. The method as recited in claim 1, wherein said advertising message further includes a video program.

5. The method as recited in claim 1, wherein said input device of said mobile device further includes touch-sensitive display.

6. The method as recited in claim 1, wherein said ad hoc communication link further includes a Bluetooth type of link.

7. The method as recited in claim 1 wherein said ad hoc communication link further includes a Wi-Fi type of link.

8. The method as recited in claim 1, wherein said ad hoc communication link further includes a Near Field Communication link comprising a reader in the mobile device and a storage tag in the television system.

9. A method of delivering an advertising message to a mobile computing and communication device, comprising:
   a. establishing an ad hoc communication link between a digital television system and the mobile device;
   b. broadcasting a program comprising a series of frames by the television system;
   c. receiving by the television system a control signal from the mobile device;
   d. freezing a frame being displayed by the television system, said frame further including a plurality of displayed items, at least one of the displayed items is associated with an advertising message stored in a data storage unit of the television system;
   e. transmitting a data file including the frozen frame and associated advertising message from the television system to the mobile communication device;
   f. storing received frame in a folder pertaining to storing images;
   g. displaying said frame on a display of the mobile device, said displayed item is marked with visible symbol indicating that said displayed items are associated with the advertising message;
   h. selecting said displayed item by the user through actuating an input device of the mobile device; and
   i. rendering the advertising message to the user through the mobile device.

10. The method as recited in claim 9, wherein said method further includes selecting by the user the stored frame by actuating an input device of the mobile device.

11. The method as recited in claim 9, where said folder is a dedicated folder for storing photographs.

12. The method as recited in claim 9, wherein said folder is a dedicated folder for storing frames.

13. The method as recited in claim 9, wherein said advertising message further comprises a link to a website, said website further including detailed contents of the advertising message.

14. A method of delivering an advertising message to a mobile computing and communication device, comprising:
   a. establishing an ad hoc communication link between a digital television system and the mobile device;
   b. broadcasting a program comprising a series of frames by the television system, wherein at least some of frames further including displayed items associated with advertising messages stored in a data storage unit of the television system;
   c. transmitting a signal from the television system to the mobile device as a result of one of the frames associated with an advertising message is being displayed;
   d. displaying an alerting symbol at a display of the mobile device in response to receiving the signal;
   e. receiving by the television system a control signal from the mobile device in response to a user's actuation of an input device of the mobile device;

f. transmitting a data file including a frame and said associated advertising message from the television system to the mobile device;

g. displaying received frame on the display of the mobile device;

h. selecting at a displayed item by a user through actuating an input device of the mobile device; and i. rendering the advertising message to the user through the mobile device.

15. The method as recited in claim 14, wherein said method further comprises removing the alerting symbol if subsequently displayed frame does not include items associated with advertising messages.

16. The method as recited in claim 14, wherein said method further comprises removing the alerting symbol if the user's actuation of the input device is not received after a predetermined period of time.

17. The method as recited in claim 14, wherein said alerting symbol further includes switching on or changing light color a light emitting device in the mobile device.

18. The method as recited in claim 14, where said visible symbol is displayed with animations.

19. The method as recited in claim 14, wherein said user actuation of the input device for generating the control signal further including touching a touch-sensitive display of the mobile device.

20. The method as recited in claim 14, wherein said received frame is stored in a folder for storing photographs.

* * * * *